(12) United States Patent
Stanley

(10) Patent No.: US 10,935,655 B2
(45) Date of Patent: Mar. 2, 2021

(54) SURFACE PENETRATING RADAR AND BATTERY SYSTEMS

(71) Applicant: Massachusetts Institute of Technology, Cambridge, MA (US)

(72) Inventor: Byron McCall Stanley, Newton, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 237 days.

(21) Appl. No.: 16/118,259

(22) Filed: Aug. 30, 2018

(65) Prior Publication Data

US 2020/0033468 A1    Jan. 30, 2020

Related U.S. Application Data

(60) Provisional application No. 62/553,229, filed on Sep. 1, 2017.

(51) Int. Cl.

| | |
|---|---|
| *G01S 13/88* | (2006.01) |
| *B60L 50/60* | (2019.01) |
| *B60K 1/04* | (2019.01) |
| *G05D 1/02* | (2020.01) |
| *H01Q 21/06* | (2006.01) |

(52) U.S. Cl.
CPC ............ *G01S 13/885* (2013.01); *B60L 50/60* (2019.02); *B60K 1/04* (2013.01); *B60K 2001/0405* (2013.01); *G05D 1/0257* (2013.01); *H01Q 21/06* (2013.01)

(58) Field of Classification Search
CPC ... B60K 1/04; B60K 2001/0405; B60L 50/60; G01S 13/885; G01S 13/42; G01S 13/931; F41H 11/136; G01V 3/08; G01V 8/005; G05D 1/0257; H01Q 21/06
See application file for complete search history.

(56) References Cited

U.S. PATENT DOCUMENTS

| | | | |
|---|---|---|---|
| 6,700,526 B2 | 3/2004 | Witten | |
| 7,456,781 B2* | 11/2008 | Honda | G01S 7/4008 342/118 |
| 8,949,024 B2 | 2/2015 | Stanley et al. | |
| 2003/0043067 A1 | 3/2003 | Johansson et al. | |
| 2006/0208940 A1* | 9/2006 | Honda | G01S 7/4008 342/175 |
| 2010/0066585 A1 | 3/2010 | Hibbard et al. | |
| 2012/0133543 A1* | 5/2012 | Al-Khalefah | G01S 7/03 342/22 |
| 2012/0229323 A1* | 9/2012 | Kato | G01S 13/345 342/27 |

(Continued)

OTHER PUBLICATIONS

International Search Report & Written Opinion in PCT/US18/48958 dated Aug. 16, 2019; 7 pages.

(Continued)

*Primary Examiner* — Timothy X Pham
(74) *Attorney, Agent, or Firm* — Schmeiser, Olsen & Watts, LLP

(57) ABSTRACT

A system may include a surface penetrating radar system. The system may further include a battery system of a vehicle. At least a portion of the battery system of the vehicle may also be at least a portion of the surface penetrating radar system.

28 Claims, 6 Drawing Sheets

(56) References Cited

U.S. PATENT DOCUMENTS

| | | | | |
|---|---|---|---|---|
| 2012/0280849 A1* | 11/2012 | Chang | ............... | G01V 3/12 |
| | | | | 342/22 |
| 2014/0121964 A1 | 5/2014 | Stanley et al. | | |
| 2014/0125508 A1* | 5/2014 | Stolarczyk | ............ | G01S 13/885 |
| | | | | 342/22 |
| 2015/0268218 A1* | 9/2015 | Troxler | ................ | G01N 22/04 |
| | | | | 342/21 |
| 2016/0064703 A1* | 3/2016 | Mack | ................ | B60L 50/64 |
| | | | | 429/176 |
| 2016/0097851 A1* | 4/2016 | Zhang | ................ | B64C 39/024 |
| | | | | 342/22 |
| 2019/0064345 A1* | 2/2019 | Reed | ................ | G01S 13/885 |

OTHER PUBLICATIONS

U.S. Appl. No. 15/830,398, filed Dec. 4, 2017; 32 pages.
Lambert, Fred, "Tesla Model 3: Exclusive First Look at Tesla's New Battery Pack Architecture," electrek, https://electrek.co/2017/08/24/tesla-model-3-exclusive-battery-pack-architecture/, Aug. 24, 2017.
Anthony, Sebastian, "What is the Real Range of an Electric Car? Tesla Helps us Find the Answer," ExtremeTech, https://www.extremetech.com/extreme/196607-what-is-the-real-range-of-an-electric-car-tesla-helps-us-find-the-answer, Dec. 31, 2014.
International Preliminary Report on Patentability in PCT/US2018/048958 dated Mar. 12, 2020; 6 pages.

* cited by examiner

SURFACE PENETRATING RADAR AND BATTERY SYSTEMS

RELATED APPLICATIONS

This application claims the benefit of the earlier filing date of U.S. Provisional Patent Application No. 62/553,229, filed Sep. 1, 2017 and titled "Integration of Surface Penetrating Radar with Battery," the entirety of which is incorporated herein by reference.

GOVERNMENT RIGHTS IN THE INVENTION

This invention was made with government support under Contract No. FA8721-05-C-0002 awarded by the U.S. Air Force. The government has certain rights in the invention.

FIELD OF THE INVENTION

The present invention relates generally to surface penetrating radar and battery systems. The surface penetrating radar and battery systems may be components of vehicles.

BACKGROUND OF THE INVENTION

Surface penetrating radar (SPR) systems may be used in, for example, autonomous navigation of vehicles. SPR systems may be mounted in the front of, back of, or underneath vehicles. For example, a SPR system may include an antenna array mounted to the underside of a vehicle. SPR signals may propagate downward from transmitting antenna elements in the antenna array to and/or through a road surface under the vehicle. The SPR signals may be backscattered in an upward direction from the road surface or ground and may be detected by receiving antenna elements. The signals may be processed to identify subsurface objects or even surface objects and in turn be used for vehicle navigation purposes.

SPR systems mounted underneath vehicles may cause ground clearance issues and may emit undesired amounts of energy and waves. Thus, there may be a need to have better ground clearance and better emission control for SPR systems used in connection with vehicles.

SUMMARY

Example embodiments of the present technology include a method determining surface characteristics.

In an embodiment, a system may include a surface penetrating radar system. The system may further include a battery system of a vehicle. At least a portion of the battery system of the vehicle may also be at least a portion of the surface penetrating radar system.

In various implementations, the at least the portion of the battery system of the vehicle and the at least the portion of the surface penetrating radar system may be least a portion of a cavity shared by the battery system of the vehicle and the surface penetrating radar system. The at least the portion of the battery system of the vehicle and the at least the portion of the surface penetrating radar system may be at least a portion of a plate shared by the battery system of the vehicle and the surface penetrating radar system. The at least the portion of the battery system of the vehicle may be fused to the at least the portion of the surface penetrating radar system to create a shared portion of the system.

One or more of the following features may be included. The battery system of the vehicle may be designed to dampen energy of waves emitted by the surface penetrating radar system. The battery system of the vehicle may include a material selected to at least one of: reflect waves emitted by the surface penetrating radar system, absorb waves emitted by the surface penetrating radar system, shift a phase of waves emitted by the surface penetrating radar system, alter a path of waves emitted by the surface penetrating radar system, alter a breadth of waves emitted by the surface penetrating radar system, and alter an angle of waves emitted by the surface penetrating radar system. The material may be selected from the group consisting of: a metal, a high permittivity material (e.g., a dielectric material), and a high permeability material.

In an embodiment, a surface penetrating radar system may be integrated with a battery system of a vehicle.

In various implementations, the battery system of the vehicle may share a portion of the surface penetrating radar system. At least a portion of a bottom surface of the battery system of the vehicle may also be at least a portion of a top surface of the surface penetrating radar system. Similarly, using the techniques and features described in the present disclosure, a bottom surface of the surface penetrating radar system may be fused with a top surface of the battery system.

One or more of the following features may be included. The battery system of the vehicle may be designed to dampen energy of waves emitted by the surface penetrating radar system. The battery system of the vehicle may include a material selected to at least one of: reflect waves emitted by the surface penetrating radar system, absorb waves emitted by the surface penetrating radar system, shift a phase of waves emitted by the surface penetrating radar system, alter a path of waves emitted by the surface penetrating radar system, alter a breadth of waves emitted by the surface penetrating radar system, and alter an angle of waves emitted by the surface penetrating radar system. The material may be selected from the group consisting of: a metal, a high permittivity material (e.g., a dielectric material), and a high permeability material.

In an embodiment, a surface penetrating radar system may be shaped to mount to a battery system of a vehicle.

In various implementations, the surface penetrating radar system may be mountable to the battery system of the vehicle upon removal of a portion of the battery system of the vehicle. The surface penetrating radar system may be mountable to the battery system of the vehicle upon removal of a portion of the surface penetrating radar system. Upon mounting the surface penetrating radar system to the battery system of the vehicle, at least a portion of a bottom surface of the battery system of the vehicle may also be at least a portion of a top surface of the surface penetrating radar system.

One or more of the following features may be included. The battery system of the vehicle may be designed to dampen energy of waves emitted by the surface penetrating radar system. The battery system of the vehicle may include a material selected to at least one of: reflect waves emitted by the surface penetrating radar system, absorb waves emitted by the surface penetrating radar system, shift a phase of waves emitted by the surface penetrating radar system, alter a path of waves emitted by the surface penetrating radar system, alter a breadth of waves emitted by the surface penetrating radar system, and alter an angle of waves emitted by the surface penetrating radar system. The material may be selected from the group consisting of: a metal, a high permittivity material (e.g., a dielectric material), and a high permeability material.

In an embodiment, an array of antenna elements may be configured to transmit surface penetrating radar signals into a subsurface region and to receive radar signals comprising scattered signals from the subsurface region. The array may be partially surrounded by a plurality of batteries or battery elements which may absorb energy from the surface penetrating radar signals.

In an embodiment, a linear array of antenna elements may be configured to transmit surface penetrating radar signals into a subsurface region and to receive a scattered signals from the subsurface region. The linear array may be partially enclosed by an arrangement of a plurality of batteries or battery elements which may absorb energy in the surface penetrating radar signals. The arrangement of the batteries or battery elements may have an opening therein through which transmitted SPR signals and scattered signals may pass.

BRIEF DESCRIPTION OF THE DRAWINGS

The techniques and features of the present disclosure may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the techniques and features of the present disclosure.

DETAILED DESCRIPTION

Reference is made in various embodiments described below to ground and a surface of the ground. It will be understood that the ground includes soil, road surface or pavement such as asphalt and concrete layers, gravel, sand and the like, and that the surface of the ground is the interface of the ground with the air, array, fluid, snow, rain, sludge, mud, or free space. In some instances, the surface may also include the surfaces that surround a tunnel, mineshaft and other passageways through which a vehicle may travel.

More generally, reference is made herein to surface penetrating radar (SPR) and ground penetrating radar (GPR). As used herein, SPR means any radar system that is configured to acquired data from a subsurface region. A SPR can be configured and oriented to obtain data for a subsurface region that is behind the surface of a wall, ceiling, floor or one or more surfaces along a tunnel or passageway. In some instances, the SPR can also obtain data for the surface. It will be recognized that a GPR system is a type of SPR system which is configured to acquire data from a region below the surface of the ground and may also acquire data for the surface of the ground. A subsurface region, as used herein, means a region behind the surface such as an underground region behind the ground surface. Alternatively, the subsurface region can be a region behind a surface of a structure, such as a region inside and/or behind a wall or ceiling structure.

In brief overview, the present disclosure relates to a system including a SPR system. The system may further include a battery system of a vehicle. At least a portion of the battery system of the vehicle may also be at least a portion of the surface penetrating radar system.

Methods and systems for localization of a vehicle using SPR or GPR are described, for example, in U.S. patent application with Ser. No. 15/830,398, titled "Method and System for Localization of a Vehicle Using Surface Penetrating Radar" and in U.S. Pat. No. 8,949,024, titled "Vehicle Localization Using Surface Penetrating Radar," the disclosures of which are both incorporated herein by reference in their entirety.

Figure 1:
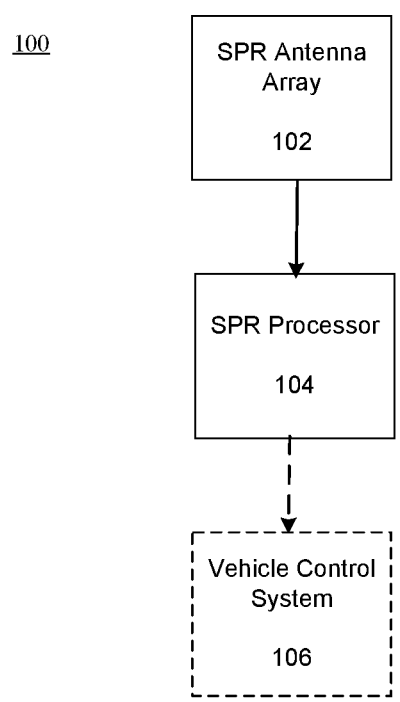
FIG. 1 shows an example SPR system in accordance with the present disclosure.

Referring now to FIG. 1, an example SPR system in accordance with the present disclosure is shown. SPR system 100 may be a mobile SPR system and may include SPR antenna array 102. For example, SPR antenna array 102 may be mounted to the underside of a vehicle. SPR antenna array 102 may include one or more transmit and receive antenna elements for transmitting and receiving radar signals. Further, SPR antenna array 102 may be in communication with SPR processor 104 which may control SPR antenna array 102. For example, SPR processor 104 may control the transmit operations of SPR antenna array 102 or one or more of the transmit and receive antenna elements therein. SPR processor 104 may receive return radar signals from SPR antenna array 102 or one or more of the antenna elements therein. SPR system 202 of FIG. 2 may be the same as, similar to, or an implementation of SPR system 100.

In implementation, SPR system 100 may also include one or more components for performing localization operations of the vehicle. For example, SPR system 100 may include a registration module, conversion module, user interface, and/or reference image source, as discussed in more detail in U.S. patent application with Ser. No. 15/830,398, mentioned above. In this way, the SPR system may also be used in a localization application for the vehicle (e.g., vehicle 200).

Figure 2:
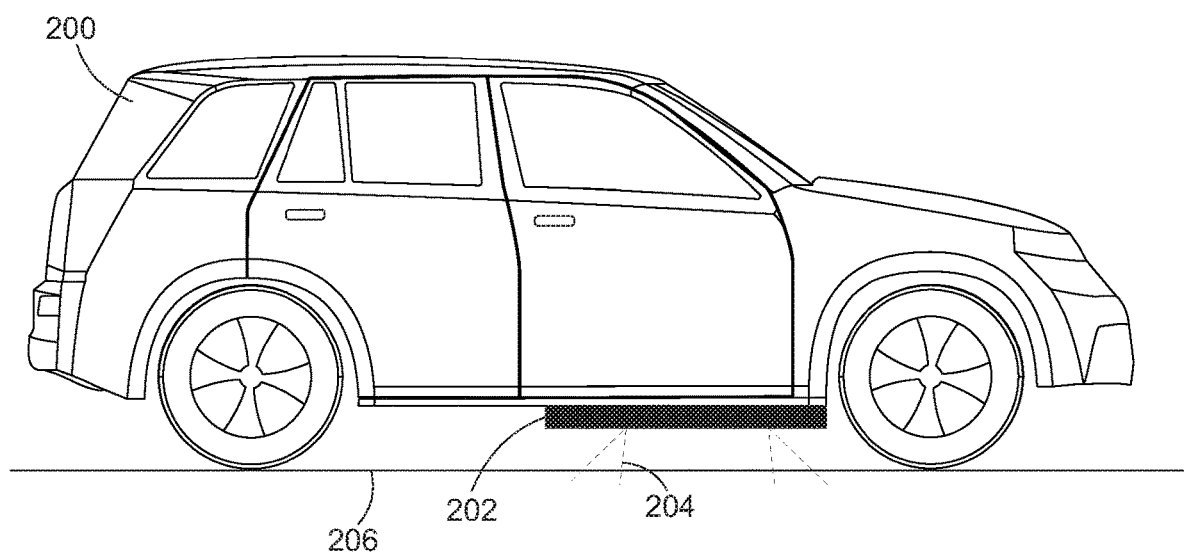
FIG. 2 shows a side view of a vehicle equipped with a SPR system in accordance with the present disclosure.

Referring also to FIG. 2, a side view of a vehicle 200 equipped with a SPR system 202 in accordance with the present disclosure is shown. It should be noted that SPR system 202 and other SPR systems described in the present disclosure may be designed for performing ground or surface penetrating radar operations and collecting data for subsurface imaging.

Although depicted as an automobile, the vehicle 200 may be any mobile platform or structure, including by way of non-limiting examples, platforms for transporting passengers or payloads such as equipment, sensors and other objects. The vehicle 200 may have the capability to change direction (i.e., steer), accelerate and decelerate. Although the vehicle 200 in the illustration is generally understood to be non-holonomic as its controllable degrees of freedom are less than the total degrees of freedom, a holonomic vehicle, such as a vehicle with omnidirectional wheels, is also contemplated. In other embodiments, the vehicle 200 may be capable of changing one or more of its altitude (or distance from the surface of the ground), pitch, yaw and roll. The vehicle 200 may include a SPR-based navigation system and may be operated in an autonomous mode. In other words, passenger operation of the vehicle 200 may be limited or absent, and there may be no remote commands received by the vehicle 200 for navigation. By way of an example, limited operation may include control of the speed by a passenger while other operations remain under autonomous control.

SPR system 202 may transmit at least one SPR signal (e.g., SPR signal 204) from at least one SPR transmit element. SPR system 202 may include an antenna array mounted to the underside of vehicle 202. The SPR antenna array may include a linear configuration of spatially-invariant transmit and receive antenna elements for transmitting and receiving radar signals. Signal 204 may be transmitted by one of the transmit antenna elements of the SPR antenna array. In other embodiments, the SPR antenna array may be located elsewhere on the vehicle 202 (e.g., mounted to the front of the vehicle) and the transmit and receive antenna elements may not be linearly arranged. The SPR antenna array may be nominally or substantially parallel to the ground surface 206 and may extend parallel or perpendicular to the direction of travel. SPR signals (e.g., signal 204) may propagate downward from the transmitting antenna elements to and/or through the road surface 206 under the vehicle 202. The SPR signals may be backscattered in an upward direction from the surface 206 or from below the surface 206 and may be detected by the receiving antenna elements.

Figure 3:
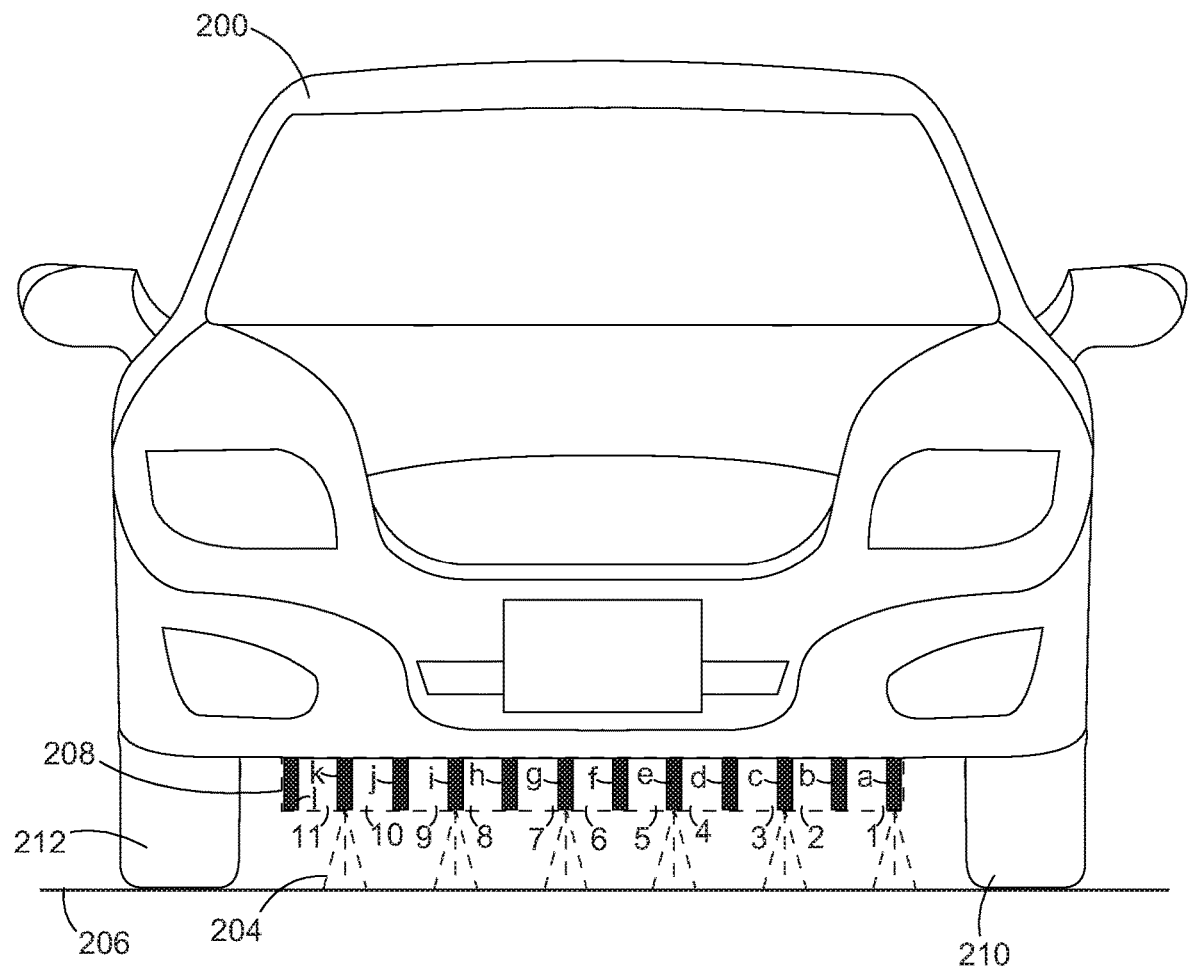
FIG. 3 shows a front view of a vehicle equipped with a SPR system in accordance with the present disclosure
Figure 4:
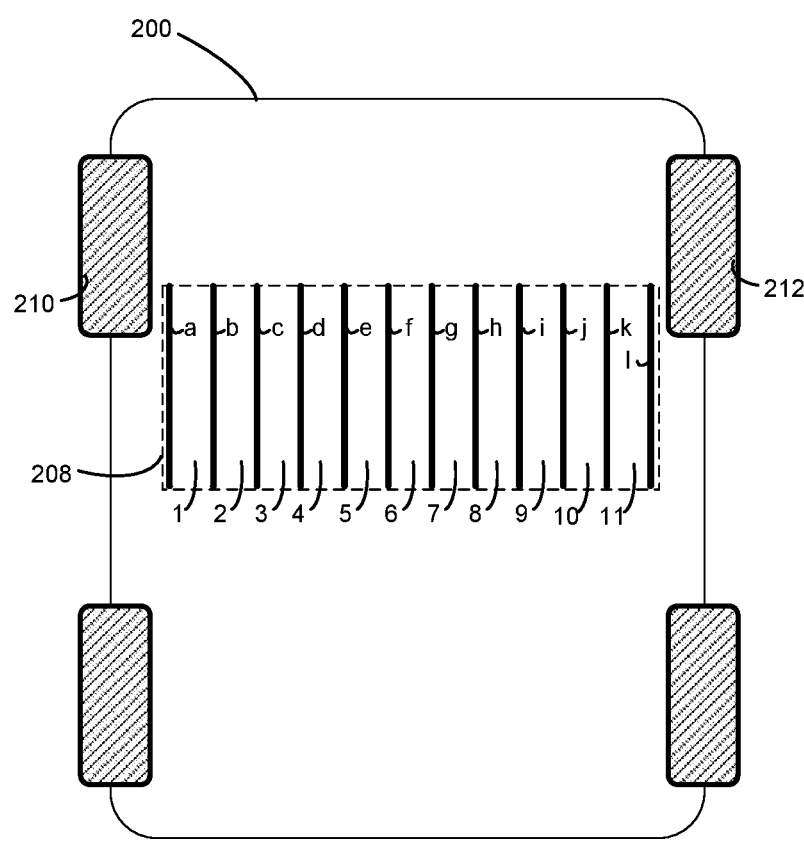
FIG. 4 shows a bottom view of a vehicle equipped with a SPR system in accordance with the present disclosure.

Referring to FIG. 3 and FIG. 4, front and bottom views of vehicle 200 are shown. SPR system 202 may include SPR antenna array 208. SPR antenna array 208 may include antenna elements a-1. While SPR antenna array 208 may include twelve antenna elements a through 1, this configuration is shown for illustrative purposes only and SPR antenna array 208 may include other numbers of antenna elements or other configurations. Antenna elements a through 1 may form eleven channels (e.g., channels 1-11). Each channel may include a transmit and a receive element or a transmit and a receive pair. For example, there may be twelve elements across SPR antenna array 208 positioned across the vehicle from the driver's side to passenger side.

In an implementation, channel 1 may be aligned with or near front tire 210 on the driver's side of vehicle 200. Channel 11 may be aligned with or near the front tire 212 on the passenger's side of vehicle 200. A set of antennas (e.g., antennas a and b) may be about 2 feet long. Each antenna may be oriented between the front and back tires of vehicle 200. One antenna (e.g., antenna a) of the channel may transmit and one antenna (e.g., antenna b) may receive. The antennas may be bar-shaped and may be spaced apart by five inches from each other. For example, antenna a may be next to front driver's side tire 210 and antenna b may be five inches closer to front passenger's side tire 212. Additional antennas c-1 may be positioned at five-inch spacings towards the passenger's side until the last antenna (1) is near passenger's side front tire 212. In this way, the SPR systems described herein may include a plurality of SPR antennas and channels positioned under the vehicle and each channel may include at least one transmit element and at least one receive element.

While the signals (e.g., signal 204) are shown in FIG. 2 and FIG. 3 as being propagated downwards towards the surface and the ground, this is shown for illustratively purposes only and the signals and waves emitted by the SPR antenna array may propagate in all directions including upwards towards the vehicle. These signals may ultimately reflect from various components and materials (e.g., battery components in the case of an electric vehicle) and may ultimately be scattered downwards or in other directions. As will be discussed further below, these signals and waves emitted upwards by the SPR antenna or otherwise away from the ground may cause problems for the SPR system including interference and emissions issues.

An SPR system may have a cavity above an antenna array of the SPR system. The cavity may provide a uniform environment for waves emitted from the SPR system to be reflected, slowed, or absorbed so as to improve overall the signals emitted from the SPR system. In the case of a SPR system that is to be mounted underneath a passenger vehicle, the cavity may reduce the ground clearance of the vehicle.

A vehicle with a SPR system may be an electric vehicle and may include a battery system or battery pack. Battery systems for electric vehicles may be much larger than battery systems for gas vehicles. A battery system for an electric vehicle may be mounted underneath the vehicle. Individual units in the battery system or battery pack may be referred to as cells. Battery packs may include many cells (e.g., over 4000 cells) and each cell may be relatively small (e.g., 18 mm) in diameter. The batteries may be made from salts such as lithium-ion salts. The battery pack may span the entirety of the base of the vehicle (but may be smaller) and may thus take up a large part of the bottom of the vehicle. The battery pack may be built into or on top of a chassis or base of the vehicle.

As discussed above, the SPR system may also be mounted underneath the vehicle. For example, the SPR system may be spaced 6 inches from ground. The SPR system may be mounted underneath the battery system or battery pack of the vehicle and in some situations may compete with the battery pack for space underneath the vehicle. This may cause ground clearance issues and other issues as the existence of the battery pack underneath the vehicle may force the SPR system closer to the ground. For example, the power and signal dispersion of the SPR system may be altered depending on how high or low the SPR system is spaced from the ground.

Using the techniques and features described in the present disclosure, the structure of the battery system or battery pack and/or its components may be designed to improve the ground clearance of a SPR system mounted underneath a vehicle and/or underneath the battery system or battery pack through, for example, fusing the cavity of the SPR system with the battery system or battery pack. The SPR antenna array may be about 1-3 inches in height and this may be the height of the SPR system. By fusing some of the SPR system or antenna array area into the battery system or battery pack (e.g., into a battery compartment), space may be saved underneath the vehicle. Even fractions of an inch of space saved under the vehicle may be valuable for ground clearance to avoid contact with objects on a road surface. By integrating the SPR system with the battery system or battery pack, valuable ground clearance may be gained.

Figure 5:
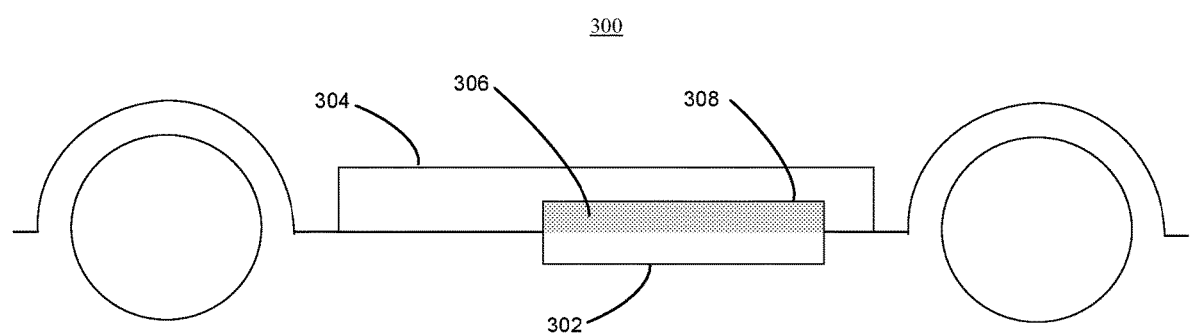
FIG. 5 shows a side view of an SPR system integrated with a battery system of an electric vehicle in accordance with the present disclosure.

Referring now to FIG. 5, in an embodiment, a system 300 may include a SPR system 302. SPR system 302 may include an antenna array as discussed above. System 300 may further include a battery system 304 of a vehicle. Battery system 304 may include battery cells and a battery pack as discussed above. At least a portion (e.g., portion 306) of battery system 304 of the vehicle may also be at least a portion (e.g., portion 306) of the SPR system 302. Portion 306 may be, in part, a cavity of SPR system 302.

For example, a top of a cavity (e.g., portion 306) of SPR system 302 may be fused or otherwise integrated with a bottom of the battery pack of battery system 304 as shown in FIG. 5. Various metals such as aluminum may be compatible for both battery structure and RF reflection for a SPR system. Fusing cavity 306 with the battery pack may remove at least fractions of the height of the SPR antenna array (e.g., fractions of an inch or even more than an inch) and improve ground clearance. Thus, in an embodiment, SPR 302 system may be integrated with battery system 304 of a vehicle.

Integrating the SPR system with the battery system of the vehicle may require only minor alterations to the SPR system or battery pack of the vehicle and may mostly be a mechanical solution. Other modifications may be implemented. For example, cabling for the SPR system may be run along edges of the antenna array or be routed through the battery pack at convenient locations. In various implementations, the mounting of, and the materials used for, the top of the antenna array or the SPR system and bottom of the battery pack, may be modified. Further, materials surrounding battery cells of the battery system may be modified. Additionally, the depth of the antenna array or SPR system cavity may be modified.

In various implementations, the battery system (e.g., battery system 304) of the vehicle may share a portion (e.g., portion 306) of the SPR system (e.g., SPR system 302). At least a portion of a bottom surface (e.g., surface 308) of the battery system 304 of the vehicle may also be at least a portion (e.g., surface 308) of a top surface of the SPR system 302.

As discussed above, in various implementations, the battery system (e.g., battery system 304) of the vehicle and the SPR system (e.g., SPR system 302) may share a cavity (e.g., portion 306). The battery system (e.g., battery system 304) of the vehicle and the SPR system (e.g., SPR system 302) may also share a plate (e.g., having surface 308). These shared portions between the SPR system and the battery system (e.g., the cavity, surface, plate, etc.) may be created by fusing or otherwise integrating the SPR system and the battery system. Further, a high permittivity material (e.g., a dielectric material, which may also be thermally conductive) or a high permeability material may be used for the base or bottom surface of the battery pack or battery system and may be shared with the SPR system. While FIG. 5 shows a plate or surface 308 separating SPR system 302 and battery system 304, this is shown for example purposes only and the plate or surface 302 may not be included. For example, SPR system 302 may be partially built into the battery system 304 and no component physically separating these systems is necessary.

The SPR system may include various fasteners, connectors, or electric connectors such that it can be quickly disconnected from the battery system. Further, a mounting interface for the SPR system may be designed to separate from the battery system. For example, the SPR system cavity (e.g., at the top of the antenna array) may stay with the SPR system once disconnected or separated. Any associated cabling for the SPR system may use quick-disconnect or may allow the SPR system and/or antenna array to be moved out of the way or set aside for swapping the battery system and/or repairing and accessing the battery system. The bottom surface of the battery system may be a thin supporting layer and/or the battery cells may be held in place through other supporting structures so they do not fall when the SPR system and/or antenna array cavity is removed.

In some situations, it may be beneficial to reflect, absorb, shift, alter a path of, alter a breadth of, or alter an angle of waves emitted from the SPR system. For example, the cavity of the SPR system may be empty and a top surface (e.g., surface 308) of the SPR system may be used as a reflector. Thus, waves which are emitted upward from the antenna array of the SPR system may be reflected downward. For design purposes, the cavity may be closer to the surface of the antennas in the antenna array than desired and this may cause interference from the reflected waves/energy returning downward. Such interference may cause poor performance in the SPR system. To overcome such interference, various materials may be added inside the cavity. Depending on design considerations and constraints, materials with specific dielectric, permittivity, and/or permeability constants or characteristics may be chosen to vary the speed at which waves propagate through the cavity of the SPR system and may be used to achieve a desired shifting of the waves to overcome the interference.

In various implementations, the battery cells and/or battery pack may be used to absorb, shift, or reflect some of the energy of waves or alter a path, breadth, or angle of the waves emitted by the SPR system. While the battery system of the electric vehicle may inherently be a dynamic environment with electric and magnetic fields, thermal changes, varieties of materials, and limited space, there may be several approaches to not only optimize ground clearance (e.g., share the cavity of the SPR system or the plate at bottom of the battery pack), but also to reduce or alter wave/energy emissions for compliance or other purposes. FCC Part 15 emissions standards (e.g., Section 15.209 of FCC Part 15) or other international regulations for emissions purposes may need to be complied with.

For example, materials for various parts of the battery system including the frame, casing, cell material, compartmental materials, etc., may be selected for reflecting, absorbing, or shifting or altering purposes as discussed above. Material of the bottom of the battery pack (e.g., near surface 308) in the region with the SPR antenna array underneath (or in the region around it) may be chosen in order to change the propagation of the waves by reflecting, absorbing, or shifting. Further, any static reflections within the combined cavity or shared cavity portion may be calibrated out by selecting various materials described herein to reduce differences between various elements based on static differences that may be caused by the battery cells.

If reflecting the waves emitted by the SPR system is desired, surface 308 may be made from or coated with a metal such as aluminum. This may also benefit the battery pack as aluminum is a relatively good heat conductor. A material with higher conductivity may be used as well. It may be desirable for this material to be strong, lightweight, and thermally conductive.

In various implementations, instead of using a reflective material such as metal in the structure or surrounding material around the battery pack, the battery pack can be made of material with selected permittivity or permeability. This may have the effect of slowing down the waves passing through the material. There are a range of materials in this class that may serve both as a structural element for the battery cells and/or battery pack and also part of the cavity of the SPR system.

If absorbing the waves emitted by the SPR system is desired, surface 308 may be made from or coated with, for example, a ferrite, ceramic, or foam material. Further, the battery pack may include lithium-ion salts, which may be absorptive to signals. In an implementation, the electromagnetic properties of the materials and/or surroundings of the battery pack or battery cells may need to be adjusted or different materials may need to be selected to enable absorption rather than reflection of the signals. In this way, the battery system of the vehicle may dampen energy of waves emitted by the SPR system in an upward direction. For example, the internal components of the battery system including selected materials as described herein may dampen energy of waves emitted by the SPR system.

If shifting the phase of waves emitted by the SPR system is desired, surface 308 may be made from or coated with a dielectric material. The dielectric material may include a plastic or a nylon. The dielectric material may be positioned in the cavity. Similar approaches may be used with high permeability materials. After waves are emitted from the top of antenna, they may reflect from an object or surface which they encounter (e.g., surface 308) if the surface is a reflector such as a metal like aluminum. The waves may reflect off of the surface and travel downward towards ground. As discussed above, in some situations, the reflected waves may interfere with other waves being emitted from the antenna array or may short out an antenna of the array. If a dielectric material is used as described above, instead of reflecting off of the material, the waves may travel through it. This may change the phase of the waves. As waves pass through a dielectric material (or one with a given permittivity or permeability) for example, they may shift, and the phase may be changed.

Actual propagation of a wave through the dielectric material may be proportional to one over the square root of the product of the permittivity and permeability and may be based on a standard derivation from Maxwell's equations. For example, the speed of light (or speed of an electromagnetic wave, C) may be proportional to one over the square root (sqrt) of the product of permittivity (U, an electric property which may also be referred to as the dielectric constant) and permeability (E, a magnetic property) and may be represented as $C=1/\text{sqrt}(U*E)$.

Thus, instead of having a reflector, a chosen material (e.g., plastic or nylon) may effectively shift the phase of the waves due to tighter propagation of the waves through the material and ultimately the waves may reflect off of a different material or reflect at a later time. The waves may still ultimately propagate downward, but due to the time or phase shift, the waves may not interfere with signals being emitted from the antenna array directly downward. The material (e.g., plastic or nylon) may also disperse or attenuate the unwanted waves to some extent.

Similarly, if altering a path, breadth, or angle of the waves emitted by the SPR system is desired, surface 308 may be made from or coated with a high permittivity material (e.g., dielectric material) or a high permeability material.

Thus, materials for surface 308 or other components in the battery, shared cavity, or other parts of the SPR system or batter system may be selected from metals, high permittivity materials (e.g., dielectric materials), and high permeability materials. These materials may include, for example, aluminum, ferrites, composite materials, metamaterials, plastics, and/or nylons depending on the desired effects for waves or energy emitted from the SPR system as described herein.

In some situations, surface 308 or a plate may not be included and the cavity of the SPR system and the SPR system may share space with the battery pack without having a top surface. In this case, the waves may ultimately reflect off of the bottom of cells in the battery or any other materials that may be in the battery casing or compartment. These materials may be selected to reflect or to help scatter the signal/waves or absorb the signal/waves being emitted from the SPR system. Additionally, materials may be selected for the battery pack which may effectively conduct heat from the batteries.

In some situations, the battery pack or battery cells may cause interference within the SPR system signal band and thermal flux from the battery cells may negatively affect the SPR antenna array. Interference may be filtered or otherwise calibrated out of the system by selecting materials to surround the battery cells (inclusive of the cells themselves), and also for the cavity of the SPR system, with permeability and permittivity characteristics so as to enable absorption, attenuation, deflection, dispersion, and/or or delay of the signals to minimize interference with the SPR signal measurements. The materials selected may include any of the materials described herein and may have any of the characteristics for materials described herein based on the desired properties altering the emissions or signals. Calibration may also be done using digital or analog removal of prior measurements from current measurements.

Additionally, some signals emitted from the SPR antenna array may diffract around the edges of the system. If the battery pack extends out to this diffraction area, absorptive material may be placed in this extended area to dissipate the signals so that they do not interfere with operation of the SPR system. The extension of the structure of the battery casing or compartment may be used to further reduce any undesirable emissions from the SPR system. The extended structure may be a uniform surface from which to reflect waves (possibly in the direction of maximum gain). The extended surface may further be lined with materials to reduce the amplitude of any signals bouncing off of the battery structure (outside of the footprint of the SPR antenna array and its cavity).

Figure 6:
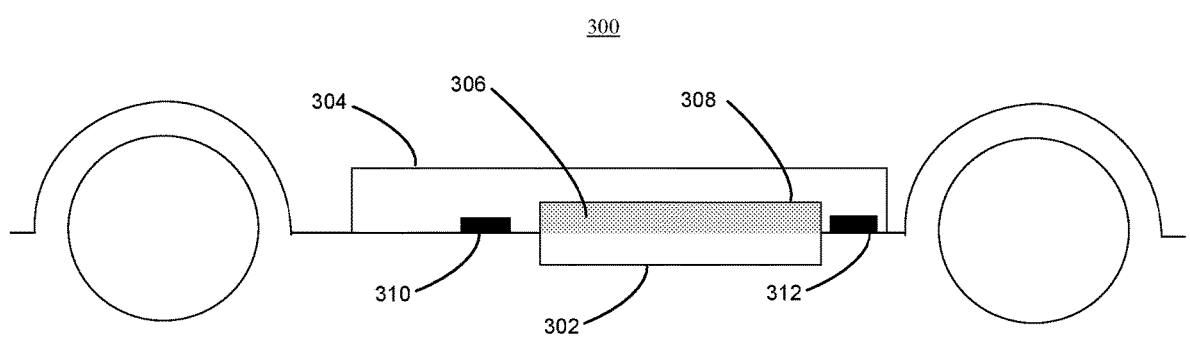
FIG. 6 also shows a side view of an SPR system integrated with a battery system of an electric vehicle in accordance with the present disclosure.

For example, referring now to FIG. 6, in an embodiment, components 310 and 312 may be positioned in the battery structure outside of the SPR system to further absorb, reflect, shift, or otherwise change emissions (e.g., change gain, angle, etc.) from the SPR antenna array in order to, for example, shape an end response. The materials selected may include any of the materials described herein and may have any of the characteristics for materials described herein based on the desired properties for altering the emissions or signals.

For compliance purposes (e.g., FCC or international regulations), when emissions measurements are taken with a sensor to determine whether the SPR system is in compliance, the system is measured on its own without the vehicle above it. Thus, the overall emissions measurements will likely be greater as the materials of the vehicle are not present to reflect or absorb emissions from the SPR antenna array. However, using the techniques and features described in the present disclosure, by fusing or integrating the SPR system and the battery system of the vehicle, the combined SPR/battery system may be used to take emissions measurements for compliance purposes and the various absorption features described herein may decrease SPR system emissions for compliance purposes (i.e., to meet power and field emissions requirements of regulatory bodies such as the FCC and related Part 15 standards).

In an embodiment, the SPR system may be provided separately from the battery system or the vehicle and may be configured to be integrated or fused with the battery system or battery pack. Thus, the SPR system may be shaped to mount to a battery system of a vehicle. In various implementations, the SPR system may be mountable to the battery system of the vehicle upon removal of a portion of the battery system of the vehicle. The SPR system may also or alternatively be mountable to the battery system of the vehicle upon removal of a portion of the SPR system. Upon mounting the SPR system to the battery system of the vehicle, at least a portion of a bottom surface (e.g., surface 308) of the battery system of the vehicle may also be at least a portion of a top surface of the surface penetrating radar system. Similarly, using the techniques and features described in the present disclosure, a bottom surface of the surface penetrating radar system may be fused with a top surface of the battery system.

It should be noted that while the techniques and features of the present disclosure are described in connection with integrating the SPR system and the battery system, other configurations are possible. For example, the SPR system or antenna array may also be integrated with or alternatively be integrated with other components of the vehicle, including but not limited to a chassis, bumper, or other component of the vehicle.

While it has been described above that the SPR system and battery system of the vehicle may be integrated or fused such as by having a common surface, portion, or cavity, the SPR system and battery system of the vehicle may be even more fully integrated. For example, the SPR antenna array may be partially surrounded by a plurality of batteries or battery elements (e.g., battery cells) which may absorb energy from the SPR signals. The arrangement of the batteries or battery elements (e.g., battery cells) may have an opening therein through which transmitted SPR signals and scattered signals may pass.

While the invention has been shown and described with reference to specific embodiments, it should be understood by those skilled in the art that various changes in form and detail may be made therein without departing from the scope of the invention.

What is claimed is:

1. A system comprising:
a surface penetrating radar system defined in a first space; and
a battery system of an electric vehicle defined in a second space, wherein a portion of the second space is included in the first space and includes a cavity of the surface penetrating radar system.

2. The system of claim 1, wherein a portion of the battery system of the vehicle in the portion of the second space included in the first space is fused to a portion of the surface penetrating radar system in the portion of the second space included in the first space to create a shared portion of the system.

3. The system of claim 1, wherein the battery system dampens energy of waves emitted by the surface penetrating radar system.

4. The system of claim 1, wherein the battery system comprises a material selected from the group consisting of: a metal, a high permittivity material, and a high permeability material.

5. The system of claim 1, wherein at least a portion of a bottom surface of the battery system of the vehicle is also at least a portion of a top surface of the surface penetrating radar system.

6. The system of claim 1, wherein the surface penetrating radar system is shaped to mount to the battery system.

7. The system of claim 6, wherein the surface penetrating radar system is mountable to the battery system upon removal of a portion of the battery system.

8. The system of claim 6, wherein the surface penetrating radar system is mountable to the battery system upon removal of a portion of the surface penetrating radar system.

9. The system of claim 1 wherein the battery system comprise a material selected to reflect waves emitted by the surface penetrating radar system.

10. The system of claim 1 wherein the battery system comprise a material selected to absorb waves emitted by the surface penetrating radar system.

11. The system of claim 1 wherein the battery system comprise a material selected to shift a phase of waves emitted by the surface penetrating radar system.

12. The system of claim 1 wherein the battery system comprise a material selected to alter a path of waves emitted by the surface penetrating radar system.

13. The system of claim 1 wherein the battery system comprise a material selected to alter a breadth of waves emitted by the surface penetrating radar system.

14. The system of claim 1 wherein the battery system comprise a material selected to alter an angle of waves emitted by the surface penetrating radar system.

15. A system comprising:
a surface penetrating radar system defined in a first space; and
a battery system of an electric vehicle defined in a second space, wherein a portion of the second space is included in the first space and includes at least a portion of a plate shared by the battery system and the surface penetrating radar system.

16. The system of claim 15, wherein a portion of the battery system of the vehicle in the portion of the second space included in the first space is fused to a portion of the surface penetrating radar system in the portion of the second space included in the first space to create a shared portion of the system.

17. The system of claim 15, wherein the battery system dampens energy of waves emitted by the surface penetrating radar system.

18. The system of claim 15, wherein the battery system comprises a material selected from the group consisting of: a metal, a high permittivity material, and a high permeability material.

19. The system of claim 15, wherein at least a portion of a bottom surface of the battery system of the vehicle is also at least a portion of a top surface of the surface penetrating radar system.

20. The system of claim 15, wherein the surface penetrating radar system is shaped to mount to the battery system.

21. The system of claim 20, wherein the surface penetrating radar system is mountable to the battery system upon removal of a portion of the battery system.

22. The system of claim 20, wherein the surface penetrating radar system is mountable to the battery system upon removal of a portion of the surface penetrating radar system.

23. The system of claim 15 wherein the battery system comprise a material selected to reflect waves emitted by the surface penetrating radar system.

24. The system of claim 15 wherein the battery system comprise a material selected to absorb waves emitted by the surface penetrating radar system.

25. The system of claim 15 wherein the battery system comprise a material selected to shift a phase of waves emitted by the surface penetrating radar system.

26. The system of claim 15 wherein the battery system comprise a material selected to alter a path of waves emitted by the surface penetrating radar system.

27. The system of claim 15 wherein the battery system comprise a material selected to alter a breadth of waves emitted by the surface penetrating radar system.

28. The system of claim 15 wherein the battery system comprise a material selected to alter an angle of waves emitted by the surface penetrating radar system.

* * * * *